US012590037B2

(12) United States Patent
Zhu et al.

(10) Patent No.: US 12,590,037 B2
(45) Date of Patent: Mar. 31, 2026

(54) LOW FRICTION COATING FOR MELT BLOWN DIE AND PREPARATION METHOD FOR COATING

(71) Applicants:Taizhou University, Taizhou City (CN); Zhejiang Jingcheng Mold Machinery Co., Ltd., Taizhou City (CN); Taizhou Clean Carbon Technology Co., Ltd., Taizhou City (CN)

(72) Inventors: Liu Zhu, Taizhou City (CN); Jinfang Wang, Taizhou City (CN); Huibin Dai, Taizhou City (CN); Sheng Dai, Taizhou City (CN); Weichao Dai, Taizhou City (CN); Shixin Ma, Taizhou City (CN); Zhibiao Tu, Taizhou City (CN)

(73) Assignees: Taizhou University, Taizhou City (CN); Zhejiang Jingcheng Mold Machinery Co., Ltd., Taizhou City (CN); Taizhou Clean Carbon Technology Co., Ltd., Taizhou City (CN)

( * ) Notice: Subject to any disclaimer, the term of this patent is extended or adjusted under 35 U.S.C. 154(b) by 870 days.

(21) Appl. No.: 17/842,679

(22) Filed: Jun. 16, 2022

(65) Prior Publication Data

US 2023/0295051 A1 Sep. 21, 2023

(30) Foreign Application Priority Data

Mar. 17, 2022 (CN) .......................... 202210263782.2

(51) Int. Cl.
*C04B 35/505* (2006.01)
*C09D 1/00* (2006.01)

(52) U.S. Cl.
CPC .............. *C04B 35/505* (2013.01); *C09D 1/00* (2013.01); *C04B 2235/3225* (2013.01); *C04B 2235/3227* (2013.01); *C04B 2235/3229* (2013.01)

(58) Field of Classification Search
CPC .......... C04B 35/505; C04B 2235/3225; C04B 2235/3227; C04B 2235/3229; C09D 1/00
(Continued)

(56) References Cited

FOREIGN PATENT DOCUMENTS

| CN | 101935829 A | * | 1/2011 |
| CN | 103409737 A | * | 11/2013 |

(Continued)

OTHER PUBLICATIONS

Machine translation of CN 113463072 A. (Year: 2021).*
(Continued)

*Primary Examiner* — Coris Fung
*Assistant Examiner* — Catriona M Corallo

(57) ABSTRACT

The present disclosure belongs to the technical field of melt blown dies, and provides a preparation method for a low friction coating for a melt blown die. In the present disclosure, pretreatment, activation treatment, chemical deposition, and calcination are conducted on a surface of the melt blown die in sequence to deposit an Ni—P—Re coating on the surface of the melt blown die, thereby reducing the friction coefficient of the melt blown die. In the present disclosure, surface smoothness and hardness of the coating are improved by limiting the composition and ratio of a deposition solution used for the chemical deposition. The results of examples show that the low friction coating for a melt blown die prepared by the preparation method provided by the present disclosure has a thickness of 3.2 μm, hardness of 820 HV, roughness Ra of 0.02 μm, and a friction coefficient of 0.35 under non-lubricating conditions.

10 Claims, 4 Drawing Sheets

(58) Field of Classification Search
USPC ...................................................... 106/286.1
See application file for complete search history.

(56)                    References Cited

FOREIGN PATENT DOCUMENTS

| | | | | |
|----|-----------|---|---------|------------|
| CN | 212895280 | U | * 4/2021 | |
| CN | 113463072 | A | * 10/2021 | ............. C23C 18/50 |

OTHER PUBLICATIONS

Machine translation of CN 103409737 A. (Year: 2013).*
Machine translation of CN 101935829 A. (Year: 2011).*
Machine translation of CN 212895280 U. (Year: 2021).*
Sudagar, J., Lian, J., & Sha, W. (2013). Electroless nickel, alloy, composite and nano coatings—A critical review. Journal of Alloys and Compounds, 571, 183-204. https://doi.org/10.1016/j.jallcom.2013.03.107 (Year: 2013).*

* cited by examiner

Stainless steel die parts

S4800 15.0kV 16.7mm x1.50k          30.0um

LOW FRICTION COATING FOR MELT BLOWN DIE AND PREPARATION METHOD FOR COATING

CROSS REFERENCE TO RELATED APPLICATION

This patent application claims the benefit and priority of Chinese Patent Application No. 202210263782.2, filed on Mar. 17, 2022, the disclosure of which is incorporated by reference herein in its entirety as part of the present application.

TECHNICAL FIELD

The present disclosure relates to the technical field of melt blown dies, and in particular, to a low friction coating for a melt blown die and a preparation method for the coating.

BACKGROUND ART

Melt blown nonwovens are core materials for mask production and are key anti-epidemic materials for COVID-19. At present, the international melt blown nonwovens technology is advancing by leaps and bounds. Some multinational companies occupy the high-end and active position of the global vertical division of labor by virtue of their advantages in technology and supply chain integration, and monopolize most of the melt blown nonwovens market. However, due to the manufacturing precision, domestic nonwovens manufacturers mainly rely on imports for the production equipment and key components, which brings many limitations and forms huge risks in the industrial chain.

The melt blown nonwovens process is to use high-speed hot air to draw the thin stream of polymer melt extruded from the spinneret hole of the die, thereby forming ultra-fine fibers and condensing on the drum, and finally relying on self-bonding. The die is the most critical part of the melt blown equipment. The uniformity of the products is closely related to the die. Therefore, the machining accuracy of the surface of the die parts, especially the spinneret hole of the die, is required to be high. Generally, the surface of the die parts is required to have high surface smoothness and low friction coefficient, so as to ensure the uniformity of the products. In addition, high hardness is required, and wear resistance needs to be improved, so as to ensure the service life of the die parts. However, since the diameter of the spinneret hole of the die is usually less than 1 mm, the traditional machining method cannot guarantee the precision requirements of the die parts, resulting in that the products cannot meet the quality requirements. Therefore, how to make the surface of the melt blown die smooth, low in friction coefficient, and high in hardness has become an urgent problem to be solved in the art.

SUMMARY

An objective of the present disclosure is to provide a low friction coating for a melt blown die and a preparation method for the coating. The low friction coating for a melt blown die prepared by the preparation method provided by the present disclosure has a low friction coefficient, high hardness, and low roughness.

To achieve the above objective, the present disclosure provides the following technical solutions.

The present disclosure provides a preparation method for a low friction coating for a melt blown die, including: conducting pretreatment, activation treatment, chemical deposition, and calcination on a surface of the melt blown die in sequence to prepare the low friction coating for a melt blown die. A deposition solution used for the chemical deposition includes the following components: 20-30 g/L of nickel sulfate, 60-90 g/L of trisodium citrate, 20-30 g/L of sodium hypophosphite, 20-30 g/L of boric acid, 0.2-0.4 g/L of copper sulfate, 10-40 mg/L of rare earth oxide, and 8-13 g/L of sodium hydroxide.

Preferably, the rare earth oxide may be selected from the group consisting of $CeO_2$, $Y_2O_3$, and $La_2O_3$.

Preferably, the chemical deposition may be conducted at 60-80° C. for 0.5-3 h.

Preferably, the pretreatment may include chemical degreasing, cleaning, and roughening which are conducted in sequence.

Preferably, the chemical degreasing may be conducted at 60-80° C. for 30-60 min.

Preferably, a roughening solution used for the roughening may be an acid solution with a mass concentration of 15-25%. The roughening may be conducted for 2-4 min.

Preferably, the acid solution may be selected from the group consisting of a hydrochloric acid solution, a sulfuric acid solution, and a nitric acid solution.

Preferably, an activation solution used for the activation treatment may be a hydrochloric acid solution with a mass concentration of 3-6%. The activation treatment may be conducted for 1-2 min.

Preferably, the calcination may be conducted at 350-500° C. for 0.5-1 h.

The present disclosure further provides a low friction coating for a melt blown die prepared by the preparation method according to the above technical solution. The low friction coating has a friction coefficient of 0.35-0.39 under non-lubricating conditions.

The present disclosure provides a preparation method for a low friction coating for a melt blown die, including: conducting pretreatment, activation treatment, chemical disposition, and calcination on a surface of the melt blown die in sequence to prepare the low friction coating for a melt blown die. A deposition solution used for the chemical deposition includes the following components: 20-30 g/L of nickel sulfate, 60-90 g/L of trisodium citrate, 20-30 g/L of sodium hypophosphite, 20-30 g/L of boric acid, 0.2-0.4 g/L of copper sulfate, 10-40 mg/L of rare earth oxide, and 8-13 g/L of sodium hydroxide. In the present disclosure, pretreatment, activation treatment, chemical deposition, and calcination are conducted on the surface of the melt blown die in sequence to deposit an Ni—P—Re coating on the surface of the melt blown die, thereby reducing the friction coefficient of the melt blown die. Moreover, in the present disclosure, surface smoothness and hardness of the coating are improved by limiting the composition and ratio of a deposition solution used for the chemical deposition. The results of examples show that the low friction coating for a melt blown die prepared by the preparation method provided by the present disclosure has a thickness of 3.2 μm, hardness of 820 HV, roughness Ra of 0.02 μm, and a friction coefficient of 0.35 under non-lubricating conditions.

DETAILED DESCRIPTION OF THE EMBODIMENTS

Figure 1:
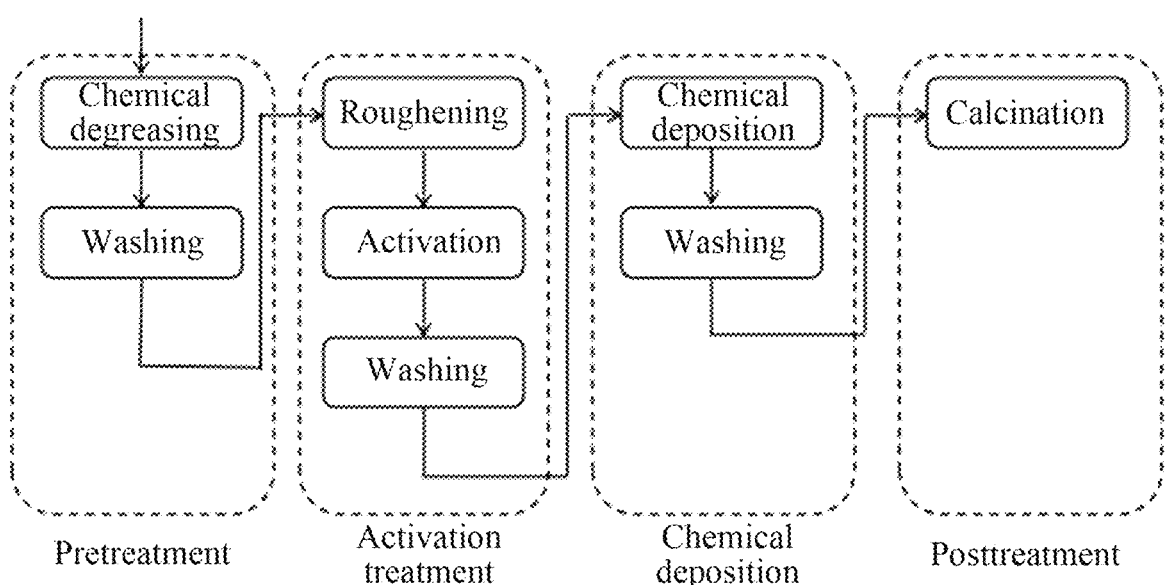
FIG. 1 is a process flow diagram for preparing a low friction coating for a melt blown die in Example 1 of the present disclosure.

The present disclosure provides a preparation method for a low friction coating for a melt blown die, including: conducting pretreatment, activation treatment, chemical disposition, and calcination on a surface of the melt blown die in sequence to prepare the low friction coating for a melt blown die. A deposition solution used for the chemical deposition includes the following components: 20-30 g/L of nickel sulfate, 60-90 g/L of trisodium citrate, 20-30 g/L of sodium hypophosphite, 20-30 g/L of boric acid, 0.2-0.4 g/L of copper sulfate, 10-40 mg/L of rare earth oxide, and 8-13 g/L of sodium hydroxide.

In the present disclosure, pretreatment, activation treatment, chemical deposition, and calcination are conducted on the surface of the melt blown die in sequence to prepare the low friction coating for a melt blown die. In the present disclosure, pretreatment, activation treatment, chemical deposition, and calcination are conducted on the surface of the melt blown die in sequence to deposit an Ni—P—Re coating on the surface of the melt blown die, thereby reducing the friction coefficient of the melt blown die.

The preparation method provided by the present disclosure is suitable for melt blown dies with various models or materials. In the present disclosure, the material of the melt blown die is preferably stainless steel.

In the present disclosure, the surface of the melt blown die is pretreated to obtain a pretreated surface. In the present disclosure, the pretreatment preferably includes chemical degreasing, cleaning, and roughening which are conducted in sequence.

In the present disclosure, the oil stain on the surface of the melt blown die is preferably removed by chemical degreasing, such that the coating can be smoothly deposited on the surface of the die without falling off. In the present disclosure, a degreasing solution used for the chemical degreasing preferably includes the following components: 30-50 g/L of sodium hydroxide, 30-50 g/L of sodium carbonate, 30-50 g/L of sodium phosphate, 20-30 g/L of sodium sulfate, and 2-4 g/L of sodium dodecyl sulfonate, and more preferably, 40-50 g/L of sodium hydroxide, 40-50 g/L of sodium carbonate, 40-50 g/L of sodium phosphate, 25-30 g/L of sodium sulfate, and 3-4 g/L of sodium dodecyl sulfonate. In the present disclosure, the sodium hydroxide and the sodium carbonate are used as strong bases to remove saponifiable oil. The sodium phosphate is not only a source of alkali, but also plays the role of chelating metal ions such as calcium and magnesium to soften hard water and buffering the pH of the solution. The sodium dodecyl sulfonate is used to remove unsaponifiable oil. The sodium sulfate is used to enhance wetting and emulsification.

In the present disclosure, the chemical degreasing is conducted at preferably 60-80° C., and more preferably, 75-80° C., for preferably 30-60 min, and more preferably, 30-50 min. In the present disclosure, the temperature of the chemical degreasing is preferably controlled within the above range, which is beneficial to promote the removal of oil stains on the surface of the die.

In the present disclosure, the chemical degreasing is preferably conducted under the condition of ultrasound. In the present disclosure, the power of the ultrasound is preferably 200-400 W, and more preferably, 230-350 W.

The present disclosure has no specific limitation on the cleaning operation, and a technical solution for cleaning well known to those skilled in the art may be adopted. In the present disclosure, a detergent for the cleaning is preferably water.

In the present disclosure, the imperfect oxide film on the surface of the die is preferably removed by roughening, so as to ensure the close bonding of the coating and the die. In the present disclosure, a roughening solution used for the roughening is preferably an acid solution with a mass concentration of 15-25%, and more preferably, 20-25%. The present disclosure preferably adopts the acid solution with the above mass concentration for roughening. If the concentration of the acid solution is too high, the surface of the die is corroded too fast and too severe. If the acid solution concentration is too low, the corrosion effect is poor, and the subsequent deposition effect is affected. In the present disclosure, the acid solution preferably includes selected from the group consisting of a hydrochloric acid solution, a sulfuric acid solution, and a nitric acid solution, and more preferably, a hydrochloric acid solution.

In the present disclosure, the roughening is conducted for preferably 2-4 min, and more preferably, 3-4 min. In the present disclosure, the roughening is preferably conducted under the condition of ultrasound. The power of the ultrasound is preferably 200-400 W, and more preferably, 230-350 W.

After the pretreatment is completed, the present disclosure preferably cleans the pretreated melt blown die to obtain the pretreated surface. The present disclosure has no specific limitation on the cleaning operation, and a technical solution for cleaning well known to those skilled in the art may be adopted.

After the pretreated surface is obtained, the present disclosure conducts activation treatment on the pretreated surface to obtain an activated surface. The present disclosure conducts micro-corrosion on the surface of the die through activation treatment, forms microscopic defects, improves the activity, promotes the redox reaction, and enables the process of chemical deposition on the surface of the die to start smoothly.

In the present disclosure, an activation solution used for the activation treatment is preferably a hydrochloric acid solution with a mass concentration of 3-6%, and more preferably, 3-5%. The present disclosure preferably adopts the hydrochloric acid solution with the above mass concentration for activation treatment. If the concentration of the hydrochloric acid solution is too high or too low, microscopic defects cannot be formed, and the surface activity of the die cannot be improved.

In the present disclosure, the activation treatment is conducted for preferably 1-2 min, and more preferably, 1 min. In the present disclosure, the activation treatment is preferably conducted under the condition of ultrasound. The power of the ultrasound is preferably 200-400 W, and more preferably, 230-350 W.

After the activation treatment is completed, the present disclosure preferably cleans the melt blown die subjected to the activation treatment to obtain the activated surface. The present disclosure has no specific limitation on the cleaning operation, and a technical solution for cleaning well known to those skilled in the art may be adopted. In the present disclosure, a detergent for the cleaning is preferably water.

After the activated surface is obtained, the present disclosure conducts chemical deposition on the activated surface to obtain a deposition layer. In the present disclosure, an Ni—P—Re coating is deposited on the surface of the melt blown die through chemical deposition, thereby reducing the friction coefficient of the die. In the present disclosure, a deposition solution used for the chemical deposition includes the following components: 20-30 g/L of nickel sulfate, 60-90 g/L of trisodium citrate, 20-30 g/L of sodium hypophosphite, 20-30 g/L of boric acid, 0.2-0.4 g/L of copper sulfate, 10-40 mg/L of rare earth oxide, and 8-13 g/L of sodium hydroxide.

In the present disclosure, the deposition solution used for the chemical deposition includes 20-30 g/L, preferably 25-30 g/L, of nickel sulfate. In the present disclosure, the nickel sulfate acts as the main salt to provide $Ni^{2+}$ ions. If the concentration of the nickel sulfate is too high, the excess $Ni^{2+}$ ions cannot form a stable complex, the deposition solution is turbid, and the coating quality is reduced.

In the present disclosure, the deposition solution used for the chemical deposition further includes 60-90 g/L, preferably 80-90 g/L, of trisodium citrate. In the present disclosure, the trisodium citrate acts as a complexing agent to form a complex with metal ions to prevent precipitation of the deposition solution, increase the stability of the deposition solution, prolong the service life, increase the deposition speed, and improve the pH of the deposition solution. If the concentration of the trisodium citrate is too high, the deposition speed will be decreased.

In the present disclosure, the deposition solution used for the chemical deposition further includes 20-30 g/L, preferably 25-30 g/L, of sodium hypophosphite. In the present disclosure, the sodium hypophosphite acts as a reducing agent to provide electrons to reduce $Ni^{2+}$ ions or their complexes. If the concentration of the sodium hypophosphite is too low, the reducing ability is poor, and the deposition speed is low. If the concentration is too high, the stability of the deposition solution is reduced, the service life is reduced, and the coating quality is reduced.

In the present disclosure, the deposition solution used for the chemical deposition further includes 20-30 g/L, preferably 25-30 g/L, of boric acid. In the present disclosure, the boric acid acts as a buffer to buffer the pH of the deposition solution, such that the pH of the deposition solution fluctuates within a small range.

In the present disclosure, the deposition solution used for the chemical deposition further includes 0.2-0.4 g/L, preferably 0.2-0.3 g/L, of copper sulfate. In the present disclosure, the copper sulfate is used to provide $Cu^{2+}$, stabilize the deposition process of $Ni^{2+}$, improve the bonding force between the coating and the matrix, and improve the performance of the coating. If the concentration of the copper sulfate is too high, the hardness of the coating will decrease.

In the present disclosure, the deposition solution used for the chemical deposition further includes 10-40 mg/L, preferably 20-30 mg/L, of rare earth oxide. In the present disclosure, the rare earth oxide is used for co-deposition with $Ni^{2+}$ to reduce the grain size of the deposited coating, improve the surface smoothness and hardness of the coating, and improve the overall performance of the coating. In the present disclosure, the rare earth oxide preferably includes $CeO_2$, $Y_2O_3$, or $La_2O_3$, and more preferably, $CeO_2$ or $Y_2O_3$. The present disclosure has no special limitation on a source of the rare earth oxide, and commercially available products well known to those skilled in the art may be adopted.

In the present disclosure, the deposition solution used for the chemical deposition further includes 8-13 g/L, preferably 8-10 g/L, of sodium hydroxide. In the present disclosure, the sodium hydroxide acts as a pH regulator to adjust the pH of the deposition solution. If the pH of the deposition solution is too low, the deposition speed of the coating is decreased. If the pH is too high, the deposition solution is unstable, and the performance of the prepared coating is reduced.

In the present disclosure, the chemical deposition is conducted at preferably 60-80° C., and more preferably, 70-80° C., for preferably 0.5-3 h, and more preferably, 1-2 h. In the present disclosure, the temperature of the chemical deposition is preferably controlled within the above range, which is beneficial to promote the rapid deposition of the coating. In the present disclosure, the chemical deposition is preferably conducted in a water bath. In the present disclosure, the chemical deposition is preferably conducted under the condition of ultrasound. The power of the ultrasound is preferably 200-400 W, and more preferably, 230-350 W.

After chemical deposition is completed, the present disclosure preferably cleans the melt blown die subjected to chemical deposition to obtain the deposition layer. The present disclosure has no specific limitation on the cleaning operation, and a technical solution for cleaning well known to those skilled in the art may be adopted. In the present disclosure, a detergent for the cleaning is preferably water.

After the deposition layer is obtained, the present disclosure calcines the deposition layer to obtain the low friction coating for a melt blown die. In the present disclosure, the coating is crystallized by calcination, such that the nickel coating is changed from an amorphous state to a crystalline state, and the hardness of the coating is improved. In the present disclosure, the calcination is conducted at preferably 350-500° C., and more preferably, 350-400° C., for 0.5-1 h, and more preferably, 1 h. In the present disclosure, the temperature of the calcination is preferably controlled within the above range. If the temperature of the calcination is too high, grains grow, the coating cracks, and the performance of the coating is reduced.

In the present disclosure, pretreatment, activation treatment, chemical deposition, and calcination are conducted on the surface of the melt blown die in sequence to deposit an Ni—P—Re coating on the surface of the melt blown die, thereby reducing the friction coefficient of the melt blown die. Moreover, in the present disclosure, surface smoothness and hardness of the coating are improved by limiting the composition and ratio of a deposition solution used for the chemical deposition.

The present disclosure further provides a low friction coating for a melt blown die prepared by the preparation method according to the above technical solution. The low friction coating has a friction coefficient of 0.35-0.39 under non-lubricating conditions. The low friction coating for a melt blown die provided by the present disclosure has a low friction coefficient.

In the present disclosure, the low friction coating has a thickness of preferably 3.2-10.2 μm, and more preferably 3.2-6.2 μm.

The technical solutions in the present disclosure are clearly and completely described below in conjunction with examples of the present disclosure. It is clear that the described examples are merely a part, rather than all of the examples of the present disclosure. All other examples obtained by those of ordinary skill in the art based on the examples of the present disclosure without creative efforts shall fall within the protection scope of the present disclosure.

Example 1

(1) Chemical degreasing: stainless steel melt blown die parts were immersed in a degreasing solution, subjected to ultrasonic treatment at 75° C. for 30 min with ultrasonic power of 200 W, and then ultrasonically cleaned with water. A formula of the degreasing solution was as follows: 40 g/L of sodium hydroxide NaOH, 40 g/L of sodium carbonate $Na_2CO_3$, 40 g/L of sodium phosphate $Na_3PO_4$, 25 g/L of sodium sulfate $Na_2SO_4$, and 3 g/L of sodium dodecyl sulfonate $C_{12}H_{25}SO_3Na$.

(2) Roughening: the stainless steel melt blown die parts obtained in step (1) were immersed in a hydrochloric acid solution with a mass concentration of 20%, and subjected to ultrasonic treatment for 3 min with ultrasonic power of 200 W. After the surface of the sample evenly overflows with small bubbles, the stainless steel melt blown die parts were ultrasonically cleaned with water.

(3) Activation treatment: the stainless steel melt blown die parts obtained in step (2) were immersed in a hydrochloric acid solution with a mass concentration of 5%, subjected to ultrasonic treatment for 1 min with ultrasonic power of 200 W, and then ultrasonically cleaned with water.

(4) Chemical deposition: the stainless steel melt blown die parts obtained in step (3) were immersed in a deposition solution, subjected to ultrasonic treatment for 1 h in a water bath at 80° C. with ultrasonic power of 200 W, and then ultrasonically cleaned with water. A formula of the deposition solution was as follows: 25 g/L of nickel sulfate $NiSO_4·6H_2O$, 80 g/L of trisodium citrate $C_6H_5Na_3O_7·2H_2O$, 25 g/L of sodium hypophosphite $NaH_2PO_2·H_2O$, 25 g/L of boric acid $H_3BO_3$, 0.2 g/L of copper sulfate $CuSO_4$, 20 mg/L of $CeO_2$, and 10 g/L of sodium hydroxide NaOH.

(5) Calcination: the stainless steel melt blown die parts obtained in step (4) were calcined at 400° C. for 1 h to obtain a low friction coating for a melt blown die. The coating has a thickness of 3.2 μm, hardness of 820 HV, roughness Ra of 0.02 μm, and a friction coefficient of 0.35 under non-lubricating conditions.

FIG. 1 is a process flow diagram for preparing a low friction coating for a melt blown die in the present example. The stainless steel die parts were subjected to chemical degreasing first and washed with water, then subjected to roughening and activation in sequence and washed with water, then subjected to chemical deposition and washed with water, and finally calcined to obtain a low friction coating for a melt blown die.

Figure 2:
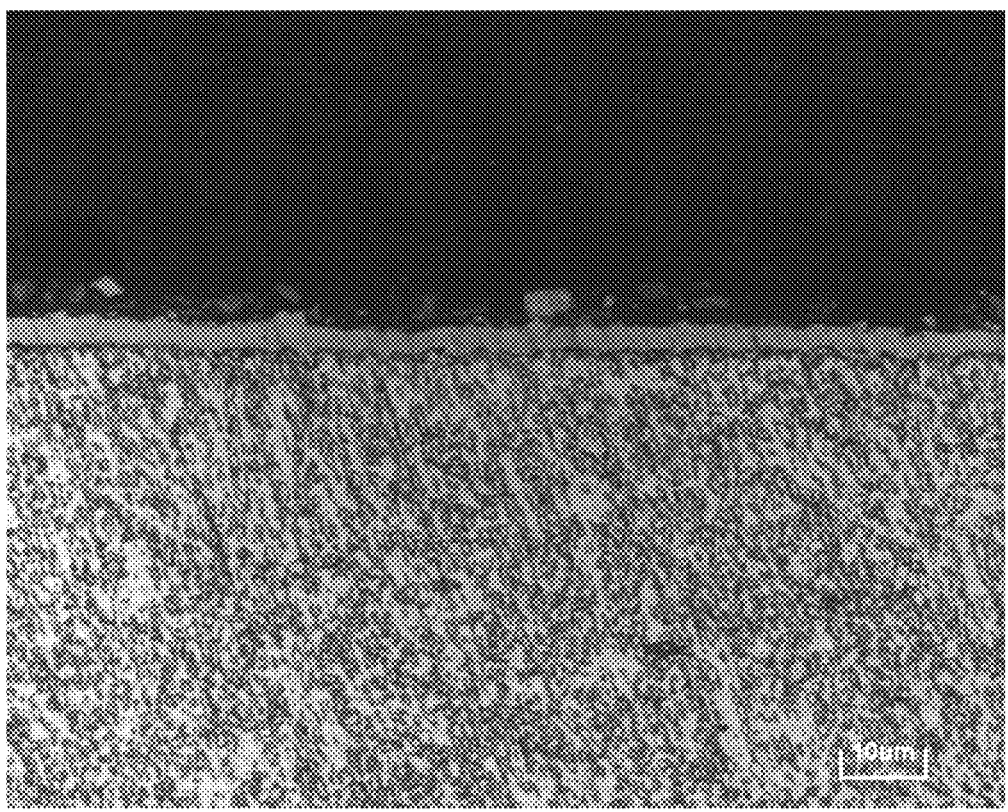
FIG. 2 is a cross-sectional view of the low friction coating and a matrix prepared in Example 1 of the present disclosure.

FIG. 2 is a cross-sectional view of the low friction coating and a matrix prepared in the present example. It can be seen from FIG. 2 that the coating is closely bonded with the matrix, there is no local peeling of the coating, and the thickness of the coating is uniform.

Figure 3:
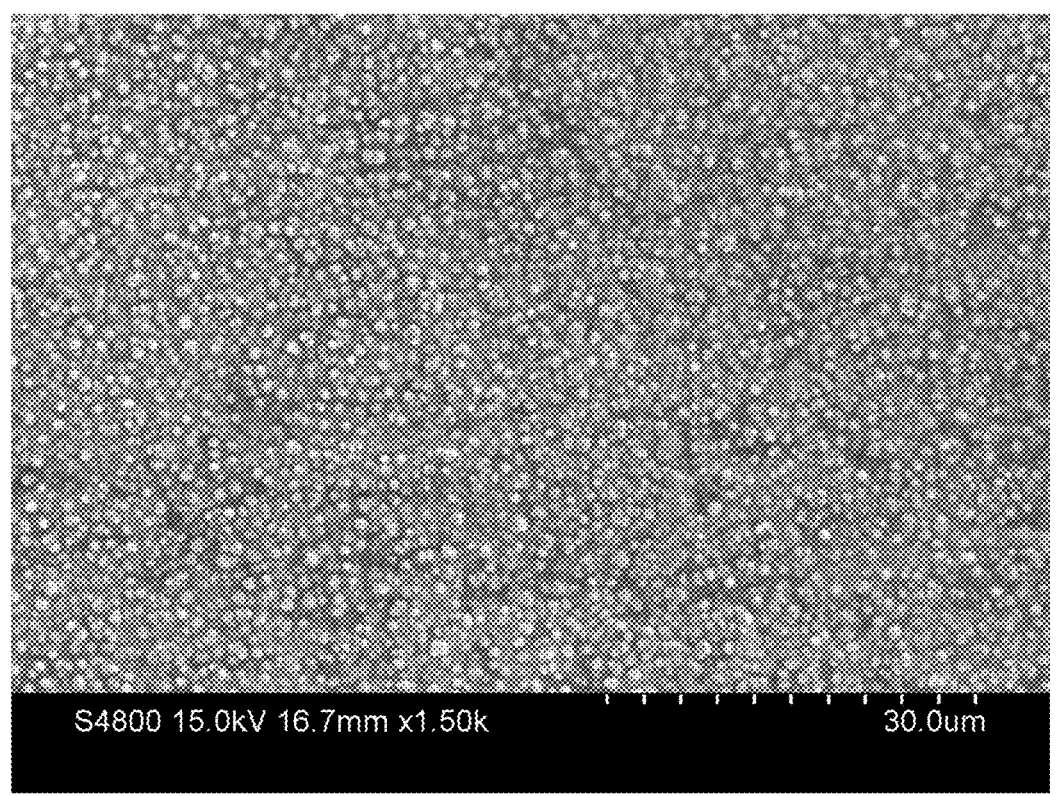
FIG. 3 is a surface topography of the low friction coating prepared in Example 1 of the present disclosure.

FIG. 3 is a surface topography of the low friction coating prepared in the present example. It can be seen from FIG. 3 that the grains of the coating are fine and the surface of the coating is smooth.

Example 2

(1) Chemical degreasing: stainless steel melt blown die parts were immersed in a degreasing solution, subjected to ultrasonic treatment at 75° C. for 30 min with ultrasonic power of 200 W, and then ultrasonically cleaned with water. A formula of the degreasing solution was as follows: 40 g/L of sodium hydroxide NaOH, 40 g/L of sodium carbonate $Na_2CO_3$, 40 g/L of sodium phosphate $Na_3PO_4$, 25 g/L of sodium sulfate $Na_2SO_4$, and 3 g/L of sodium dodecyl sulfonate $C_{12}H_{25}SO_3Na$.

(2) Roughening: the stainless steel melt blown die parts obtained in step (1) were immersed in a hydrochloric acid solution with a mass concentration of 20%, and subjected to ultrasonic treatment for 3 min with ultrasonic power of 200 W. After the surface of the sample evenly overflows with small bubbles, the stainless steel melt blown die parts were ultrasonically cleaned with water.

(3) Activation treatment: the stainless steel melt blown die parts obtained in step (2) were immersed in a hydrochloric acid solution with a mass concentration of 5%, subjected to ultrasonic treatment for 1 min with ultrasonic power of 200 W, and then ultrasonically cleaned with water.

(4) Chemical deposition: the stainless steel melt blown die parts obtained in step (3) were immersed in a deposition solution, subjected to ultrasonic treatment for 2 h in a water bath at 80° C. with ultrasonic power of 200 W, and then ultrasonically cleaned with water. A formula of the deposition solution was as follows: 25 g/L of nickel sulfate $NiSO_4·6H_2O$, 80 g/L of trisodium citrate $C_6H_5Na_3O_7·2H_2O$, 25 g/L of sodium hypophosphite $NaH_2PO_2·H_2O$, 25 g/L of boric acid $H_3BO_3$, 0.2 g/L of copper sulfate $CuSO_4$, 20 mg/L of $Y_2O_3$, and 10 g/L of sodium hydroxide NaOH.

(5) Calcination: the stainless steel melt blown die parts obtained in step (4) were calcined at 400° C. for 1 h to obtain a low friction coating for a melt blown die. The coating has a thickness of 6.2 μm, hardness of 875 HV, surface roughness Ra of 0.03 μm, and a friction coefficient of 0.36 under non-lubricating conditions.

Figure 4:
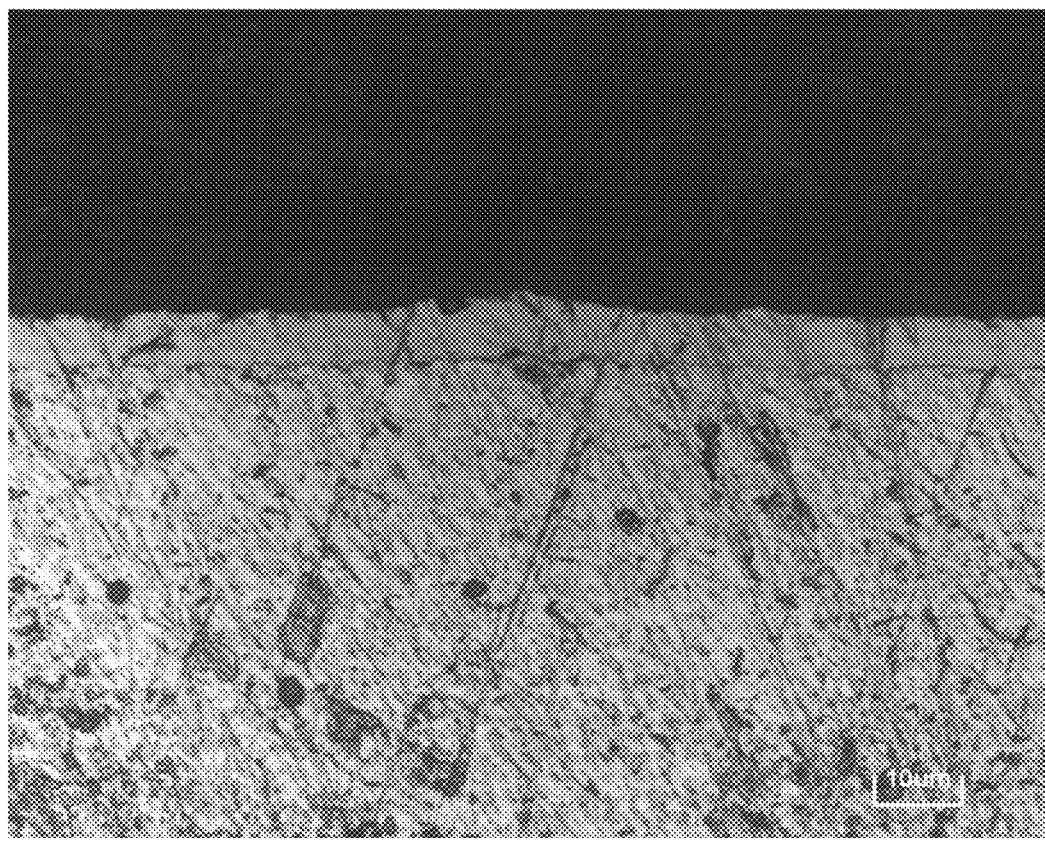
FIG. 4 is a cross-sectional view of a low friction coating and a matrix prepared in Example 2 of the present disclosure.

FIG. 4 is a cross-sectional view of the low friction coating and a matrix prepared in the present example. It can be seen from FIG. 4 that the coating is closely bonded with the matrix, there is no local peeling of the coating, and the thickness of the coating is uniform.

Figure 5:
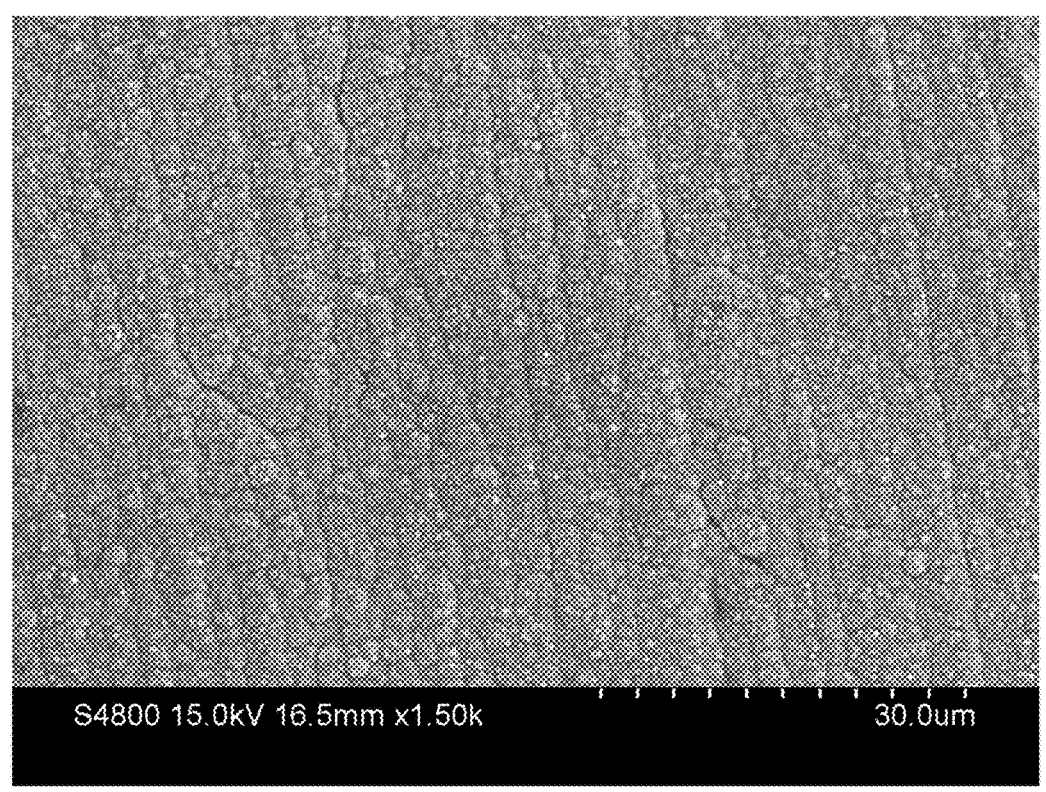
FIG. 5 is a surface topography of the low friction coating prepared in Example 2 of the present disclosure.

FIG. 5 is a surface topography of the low friction coating prepared in the present example. It can be seen from FIG. 5 that the grains of the coating are fine, and the surface of the coating is generally smooth with furrow lines in local areas.

Example 3

(1) Chemical degreasing: stainless steel melt blown die parts were immersed in a degreasing solution, subjected to ultrasonic treatment at 75° C. for 30 min with ultrasonic power of 200 W, and then ultrasonically cleaned with water. A formula of the degreasing solution was as follows: 40 g/L of sodium hydroxide NaOH, 40 g/L of sodium carbonate $Na_2CO_3$, 40 g/L of sodium phosphate $Na_3PO_4$, 25 g/L of sodium sulfate $Na_2SO_4$, and 3 g/L of sodium dodecyl sulfonate $C_{12}H_{25}SO_3Na$.

(2) Roughening: the stainless steel melt blown die parts obtained in step (1) were immersed in a hydrochloric acid solution with a mass concentration of 20%, and subjected to ultrasonic treatment for 3 min with ultrasonic power of 200 W. After the surface of the sample evenly overflows with small bubbles, the stainless steel melt blown die parts were ultrasonically cleaned with water.

(3) Activation treatment: the stainless steel melt blown die parts obtained in step (2) were immersed in a hydrochloric acid solution with a mass concentration of 5%, subjected to ultrasonic treatment for 1 min with ultrasonic power of 200 W, and then ultrasonically cleaned with water.

(4) Chemical deposition: the stainless steel melt blown die parts obtained in step (3) were immersed in a deposition solution, subjected to ultrasonic treatment for 3 h in a water bath at 80° C. with ultrasonic power of 200 W, and then ultrasonically cleaned with water. A formula of the deposition solution was as follows: 25 g/L of nickel sulfate $NiSO_4·6H_2O$, 80 g/L of trisodium citrate $C_6H_5Na_3O_7·2H_2O$, 25 g/L of sodium hypophosphite $NaH_2PO_2·H_2O$, 25 g/L of boric acid $H_3BO_3$, 0.2 g/L of copper sulfate $CuSO_4$, 20 mg/L of $CeO_2$, and 10 g/L of sodium hydroxide NaOH.

(5) Calcination: the stainless steel melt blown die parts obtained in step (4) were calcined at 400° C. for 1 h to obtain a low friction coating for a melt blown die. The coating has a thickness of 10.4 μm, hardness of 905 HV, surface roughness Ra of 0.02 μm, and a friction coefficient of 0.39 under non-lubricating conditions.

Figure 6:
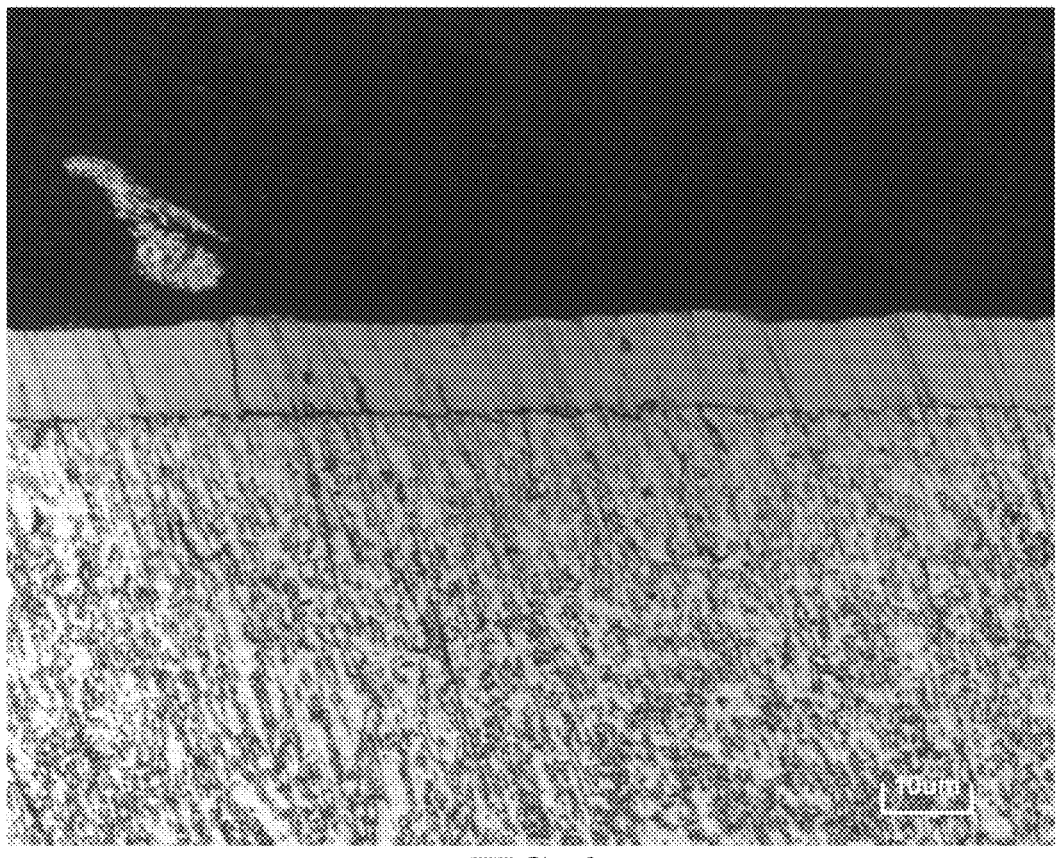
FIG. 6 is a cross-sectional view of a low friction coating and a matrix prepared in Example 3 of the present disclosure.

FIG. 6 is a cross-sectional view of the low friction coating and a matrix prepared in the present example. It can be seen from FIG. 6 that the coating is closely bonded with the matrix, there is no local peeling of the coating, and the thickness of the coating is uniform.

Figure 7:
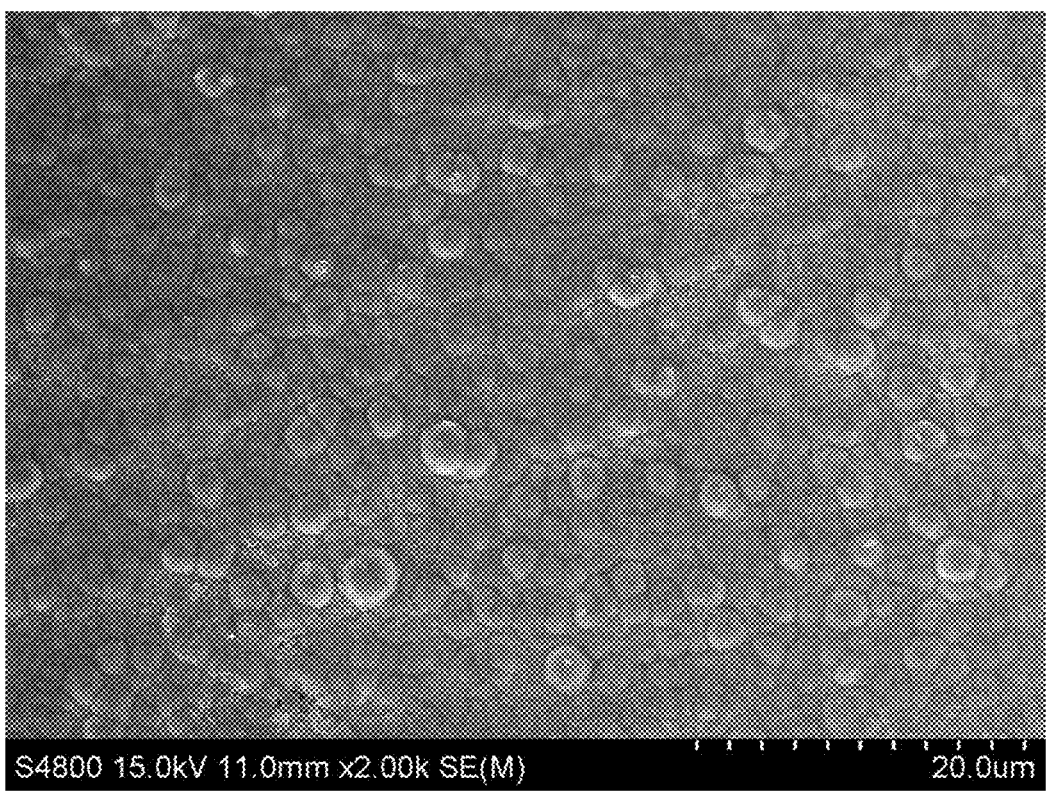
FIG. 7 is a surface topography of the low friction coating prepared in Example 3 of the present disclosure.

FIG. 7 is a surface topography of the low friction coating prepared in the present example. It can be seen from FIG. 7 that the grains of the coating grow slightly, but the grains are closely bonded with each other, and the surface of the coating is smooth.

Comparative Example 1

(1) Chemical degreasing: stainless steel melt blown die parts were immersed in a degreasing solution, subjected to ultrasonic treatment at 75° C. for 30 min with ultrasonic power of 200 W, and then ultrasonically cleaned with water. A formula of the degreasing solution was as follows: 40 g/L of sodium hydroxide NaOH, 40 g/L of sodium carbonate $Na_2CO_3$, 40 g/L of sodium phosphate $Na_3PO_4$, 25 g/L of sodium sulfate $Na_2SO_4$, and 3 g/L of sodium dodecyl sulfonate $C_{12}H_{25}SO_3Na$.

(2) Roughening: the stainless steel melt blown die parts obtained in step (1) were immersed in a hydrochloric acid solution with a mass concentration of 20%, and subjected to ultrasonic treatment for 3 min with ultrasonic power of 200 W. After the surface of the sample evenly overflows with small bubbles, the stainless steel melt blown die parts were ultrasonically cleaned with water.

(3) Activation treatment: the stainless steel melt blown die parts obtained in step (2) were immersed in a hydrochloric acid solution with a mass concentration of 5%, subjected to ultrasonic treatment for 1 min with ultrasonic power of 200 W, and then ultrasonically cleaned with water.

(4) Chemical deposition: the stainless steel melt blown die parts obtained in step (3) were immersed in a deposition solution, subjected to ultrasonic treatment for 3 h in a water bath at 80° C. with ultrasonic power of 200 W, and then ultrasonically cleaned with water. A formula of the deposition solution was as follows: 25 g/L of nickel sulfate $NiSO_4·6H_2O$, 80 g/L of trisodium citrate $C_6H_5Na_3O_7·2H_2O$, 25 g/L of sodium hypophosphite $NaH_2PO_2·H_2O$, 25 g/L of boric acid $H_3BO_3$, 0.2 g/L of copper sulfate $CuSO_4$, 20 mg/L of $CeO_2$, and 10 g/L of sodium hydroxide NaOH.

(5) Calcination: the stainless steel melt blown die parts obtained in step (4) were calcined at 600° C. for 1 h to obtain an Ni—P—Ce coating.

Figure 8:
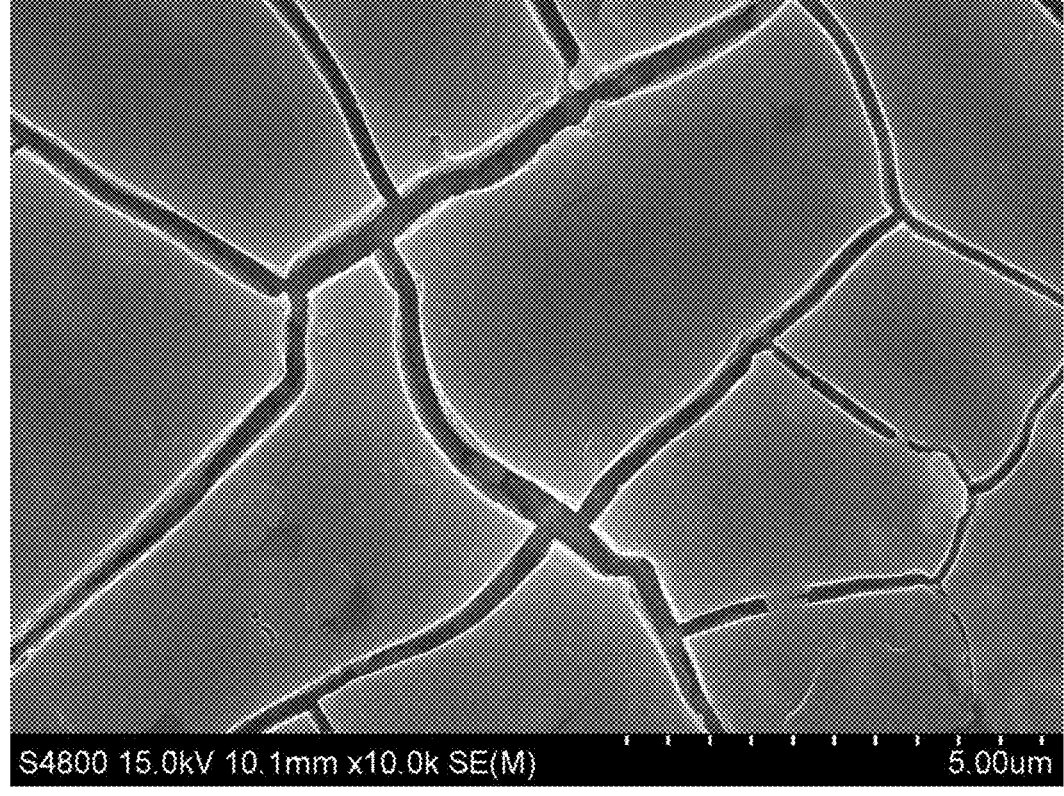
FIG. 8 is a surface topography of a coating prepared in Comparative Example 1.

FIG. 8 is a surface topography of a coating prepared in Comparative Example 1. It can be seen from FIG. 8 that the coating has many cracks during crystallization, which are broken due to the cracks, and the surface is incomplete, which affects the overall performance of the coating.

It can be seen from the above examples that the low friction coating for a melt blown die prepared by the preparation method provided by the present disclosure has a low friction coefficient, high hardness, and low roughness. The coating has a thickness of 3.2 μm, hardness of 820 HV, roughness Ra of 0.02 μm, and a friction coefficient of 0.35 under non-lubricating conditions.

The above descriptions are merely preferred implementations of the present disclosure. It should be noted that those of ordinary skill in the art may further make several improvements and modifications without departing from the principle of the present disclosure, but such improvements and modifications should be deemed as falling within the protection scope of the present disclosure.

What is claimed is:

1. A preparation method for a low friction coating for a melt blown die, comprising: conducting pretreatment, activation treatment, chemical deposition, and calcination on a surface of the melt blown die in sequence to prepare the low friction coating for a melt blown die, wherein a deposition solution used for the chemical deposition comprises the following components: 20-30 g/L of nickel sulfate, 60-90 g/L of trisodium citrate, 20-30 g/L of sodium hypophosphite, 20-30 g/L of boric acid, 0.2-0.4 g/L of copper sulfate, 10-40 mg/L of rare earth oxide, and 8-13 g/L of sodium hydroxide, wherein an activation solution used for the activation treatment is a hydrochloric acid solution with a mass concentration of 5-6%.

2. The preparation method according to claim 1, wherein the rare earth oxide is selected from the group consisting of $CeO_2$, $Y_2O_3$, and $La_2O_3$.

3. The preparation method according to claim 2, wherein the chemical deposition is conducted at 60-80° C. for 0.5-3 h.

4. The preparation method according to claim 1, wherein the chemical deposition is conducted at 60-80° C. for 0.5-3 h.

5. The preparation method according to claim 1, wherein the pretreatment comprises chemical degreasing, cleaning, and roughening which are conducted in sequence.

6. The preparation method according to claim 5, wherein the chemical degreasing is conducted at 60-80° C. for 30-60 min.

7. The preparation method according to claim 5, wherein a roughening solution used for the roughening is an acid solution with a mass concentration of 15-25%; and the roughening is conducted for 2-4 min.

8. The preparation method according to claim 7, wherein the acid solution is selected from the group consisting of a hydrochloric acid solution, a sulfuric acid solution, and a nitric acid solution.

9. The preparation method according to claim 1, wherein the activation treatment is conducted for 1-2 min.

10. The preparation method according to claim 1, wherein the calcination is conducted at 350-500° C. for 0.5-1 h.

* * * * *